United States Patent [19]

Voorhees et al.

[11] 4,318,323

[45] Mar. 9, 1982

[54] SLAVE BLADE SCRAPERS FOR A BAND SAW

[75] Inventors: John E. Voorhees, Sidney; Raymond J. Mathieu, Ludlow Falls, both of Ohio

[73] Assignee: Hobart Corporation, Troy, Ohio

[21] Appl. No.: 150,854

[22] Filed: May 19, 1980

[51] Int. Cl.³ .................. B23D 59/00; B23Q 11/00
[52] U.S. Cl. .................................................. 83/168
[58] Field of Search .................... 83/168, 788

[56] References Cited

U.S. PATENT DOCUMENTS

| D. 149,203 | 4/1948 | Meeker et al. | |
|---|---|---|---|
| D. 156,572 | 12/1949 | Spang . | |
| 659,088 | 10/1900 | McKenzie | 83/168 |
| 1,494,774 | 5/1924 | Davis . | |
| 1,872,656 | 8/1932 | Bleam | 83/168 |
| 1,908,727 | 5/1933 | Bleam | 83/168 |
| 2,423,363 | 7/1947 | Biro | 83/168 |
| 2,525,004 | 10/1950 | Spang | 83/168 X |
| 2,572,938 | 10/1951 | Lasar | 83/168 |
| 2,585,957 | 2/1952 | Meeker et al. | 83/168 |
| 3,295,400 | 1/1967 | Anderson | 83/168 X |

*Primary Examiner*—Donald R. Schran
*Attorney, Agent, or Firm*—Biebel, French & Nauman

[57] ABSTRACT

In a band saw (10) particulaly adapted for cutting meat, blade scrapers (25, 26) remove debris from the band saw blade (18) and throw it laterally and forward of the blade (18) into an enclosure (40), which can be removed without the use of tools for cleaning and for disposing of the collected debris. The location of the blade scrapers (25, 26) is slaved to the location of the saw blade (18) to automatically maintain the proper relationship for most efficient debris removal without adjustment.

6 Claims, 11 Drawing Figures

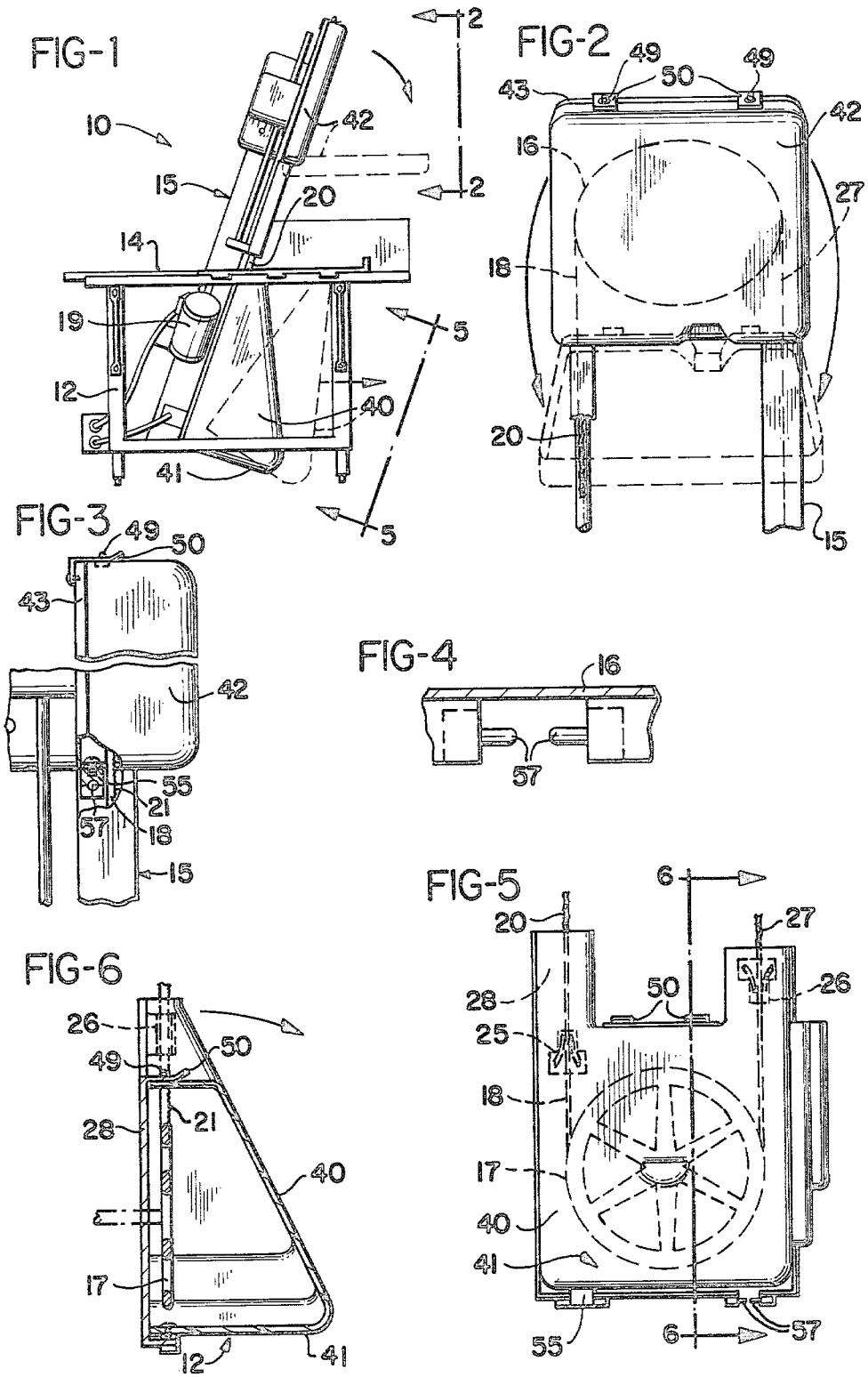

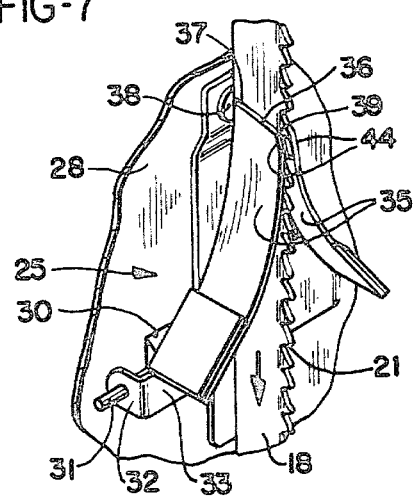
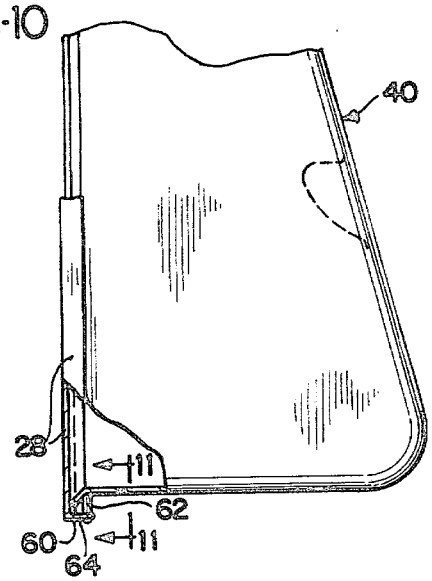
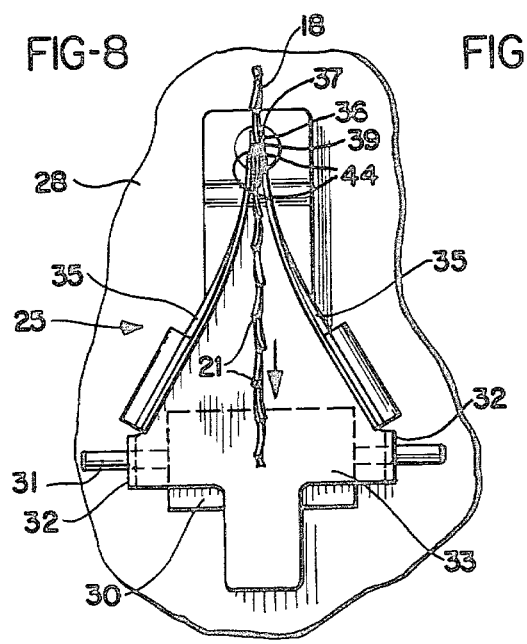
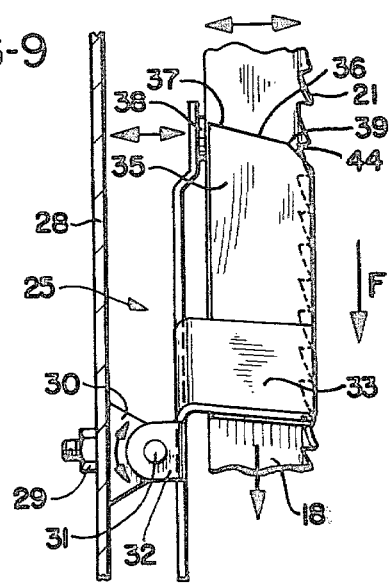
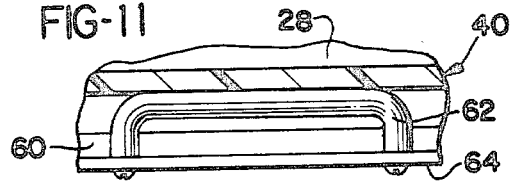

SLAVE BLADE SCRAPERS FOR A BAND SAW

BACKGROUND OF THE INVENTION

This invention relates to band saws especially adapted for cutting meat, and more particularly to slave blade scrapers for removing scrap debris from the blade of the saw. Examples of prior art meat saws may be found in U.S. Pat. Des. No. 149,203; U.S. Pat. Des. No. 156,572; and U.S. Pat. No. 2,585,957, all assigned to the assignee of the present invention. The '957 patent is apparently the same saw as shown in the '203 design patent.

Many prior art meat saws have provisions for scraping the saw blade and collecting the debris and scraps produced during the meat cutting process. The '957 saw, for example, includes a removable scrap drawer for collecting and removing the meat scraps. This device also includes wheel scrapers and blade wipers, the latter being resin impregnated fabric or the like with beveled faces which are urged toward the band saw blade by torsion springs, for removing scrap debris from the saw blade. Th blade wipers contact the saw blade along a line which is generally perpendicular to the path of travel of the saw blade. This orientation causes the debris removed from the blade to be deflected laterally from the blade, necessitating the addition of a sloping deflector surface to cause the material to fall into the scrap drawer rather than back onto the band saw blade or the wheel. Elsewhere in the meat saw, blade guides have beveled offset portions which scrape the sides of the blade and help remove the grease from the blade guide, to a location where it can be removed. Specific provision is also made for conducting debris collected in the saw head down through an integral trough to the drawer.

Unfortunately, not all of the debris is collected within the drawer, and the blade wipers are not able to follow deviations in the saw blade position in the plane of the blade during meat cutting. This may mean less than optimum performance; and the suggestion of a slave blade scraper for causing the edges of the blade wipers to follow the saw blade tooth gullets, as the blade moves when the meat is pressed against it, is lacking from this prior art. It is therefore desirable to make the debris collecting system more efficient not only because it will benefit the overall meat saw operation, but also because it will improve efficiency by requiring less operator attention during a day's work. In this context also, the meat saw should be designed so that cleaning and removal of the debris, in general, will be easy, quick, and convenient, to minimize maintenance and down time, and maximize productivity.

SUMMARY OF THE INVENTION

Briefly, the present invention contributes to satisfaction of the above needs and purposes by improved cleaning of the band saw blade with a special set of sleeve blade scrapers which follow deviations in the band saw blade position. The edges of the scrapers which contact the band saw blade are diagonally cut so that they contact the saw blade at an acute angle to the generally vertical path of travel of the saw blade. Because of this configuration, each blade scraper throws the debris which it scrapes from the band saw blade laterally and forwardly therefrom in the direction away from a lower band wheel which mounts and drives the saw blade. A removable bucket-shaped enclosure, which covers the lower band wheel and comprises the invention claimed in co-pending patent application Ser. No. 151,214 assigned to the assignee of the present application, catches and retains the debris for subsequent removal from the saw.

Each sleeve blade scraper is actually a subassembly which is attached to the base of the meat saw adjacent the band saw blade. Each subassembly includes a mount, or support member, attached directly to and supported by the meat saw base adjacent the saw blade. A pivot on the support member defines an axis of rotation behind the center line of the band saw blade and substantially transverse to the direction of movement of the portion of the band saw blade which is adjacent thereto. Rotatably mounted on the pivot is a scraper blade holder which holds a pair of scraper blades against the saw blade. Spring means between opposite sides of the mount and the scraper blade holder allow the holder to yieldably move laterally in response to lateral blade movements. The scraper blades each have a scraping edge on one end thereof, cut on a diagonal bias, and are held one each on each side of the saw blade in positions in which they are biased and spring toward each other against the saw blade. They are oriented to press the scraper blade scraping edges against the saw blade facing into the direction of movement of the saw blade to scrape and lift the debris from the saw blade. Since the scraper blades apply a scraping pressure against both sides of the saw blade, they effectively grip it frictionally therebetween. The saw blade, in turn, as it runs between the scraper blades, imparts a force to them which tends to rotate the scraper blades and the blade holder about the pivot in the direction of movement of the saw blade.

The rotation of the scraper blades and holder about the pivot is limited by a stop on the blade holder which also rotates therewith. It is positioned so that the rotation of the holder about the pivot will cause a carbide button on the stop to engage the rear edge of the band saw blade, stopping further rotation, when the scraper blades have been positioned by the rotation of the blade holder in exactly the optimum position on the saw blade for removing residues therefrom. In the preferred embodiment, this position places one end of each of the scraper blade scraping edges substantially adjacent but inwardly of the tooth gullets of the saw blade. Then, when the saw blade moves during cutting, when meat is pressed against it, the blade holder will automatically follow the saw blade and cause the scraper blades likewise to follow deviations in the saw blade position and maintain the proper scraper blade position with respect thereto.

The scraper blades are mounted so as to place the longest dimension of the blade closest to the mount for the blade holder, so that the blade length then progressively shortens across the width thereof as seen in a direction moving away from the mount. This orientation of the blades causes debris scraped from the band saw blade to be thrown laterally and forwardly of the band saw blade. Furthermore, the forward tips of the scraper blades angle outwardly or are beveled to provide clearance for the saw teeth and facilitate insertion of the band saw blade into the scraper assembly between the scraper blades.

It is therefore an object of the present invention to provide an improved debris collecting system for a meat saw; a system including scrapers for such a meat saw which will remove substantially all the residue, scraps, and other debris which accumulate on the saw blade during sawing operations; which provides these improvements through the use of at least one blade scraper engaged and located on the downwardly moving band saw blade flight between the cutting table and the lower band wheel; in which the blade scraper is positioned to scrape debris from the saw blade and throw it in a lateral and forward direction away from the saw blade and lower band wheel; in which the blade scraper may be a slave scraper which follows deviations in the saw blade position to maintain the proper position with respect thereto; in which each blade scraper may be a pair of resilient scraper blades each having a diagonally cut scraping edge across the end thereof which engages and scrapes the meat saw blade; in which the forward tips of the blade scraping edges are beveled for facilitating insertion of the saw blade between the scraper blades; and to accomplish the above objects and purposes in an inexpensive, convenient, versatile and reliable configuration readily suited to use on the widest variety of meat saws.

Other objects and advantages of the invention will be apparent from the following description, the accompanying drawings and the appended claims.

BRIEF DESCRIPTION OF THE DRAWINGS

FIG. 1 is a side view of a meat saw having scrapers according to the present invention;

FIG. 2 is a fragmentary end view of a removable upper enclosure illustrating downward rotation for removal thereof from the meat saw;

FIG. 3 is a fragmentary, partially broken away and fore-shortened side view of the FIG. 2 upper enclosure;

FIG. 4 is a plan view of the mounting pins in one form of the cooperating mounting elements for the upper and lower enclosures;

FIG. 5 is a somewhat diagrammatic end view of the lower enclosure in position on the meat saw, with a grooved block in the one form of cooperating mounting elements at the lower right omitted to show the pins on which it is supported and engaged, and with the lower band wheel and the two scraper blade sub-assemblies shown in phantom engaged upon the meat saw blade, the view being taken generally on view line 5—5 of FIG. 1;

FIG. 6 is a cross-sectional view taken generally on line 6—6 of FIG. 5;

FIG. 7 is a fragmentary perspective view of the scraper blade sub-assembly at the upper left of the meat saw base, as seen in FIG. 5;

FIG. 8 is a front view of the sub-assembly shown in FIG. 7;

FIG. 9 is a side view of the scraper blade sub-assembly shown in FIGS. 7 and 8;

FIG. 10 is an enlarged side view of the second form of cooperating elements for anchoring the enclosures to the meat saw; and FIG. 11 is a front view taken along line 11—11 in FIG. 10.

DESCRIPTION OF THE PREFERRED EMBODIMENTS

With reference to FIG. 1, a band type meat saw 10 is shown having a base 12, a cutting table 14 supported on top of the base 12, and a columnar frame 15 supported on the base 12 and extending above cutting table 14. The frame 15 supports at its upper and lower portions (FIGS. 2 and 5) means in the form of upper and lower band wheels 16 and 17 for entraining an endless band saw blade 18. The lower band wheel 17 is coupled to and driven by a drive motor 19 which is also mounted on the lower portion of the columnar frame 15. The motor 19 drives the lower band wheel 17 in a direction (counterclockwise as seen in FIG. 5) which causes an exposed band saw blade flight 20 to move downwardly at the cutting table 14.

As shown in FIG. 1, the columnar frame 15, and therefore, the blade 18 mounted by the wheels 16, 17 on the frame 15, extend in tilted relationship clockwise from the vertical. The saw blade 18 is fitted to the wheels 16, 17 such that its teeth 21 face toward the right in FIG. 1. An operator stands at the right, or in front, of the saw 10 (as viewed in FIG. 1) and pushes meat products from the right to the left on the cutting table 14, through the exposed flight 20 of the band saw blade 18.

Positioned adjacent flight 20 of the saw blade 18, just below the cutting table 14 and above the lower band wheel 17, is a slave blade scraper 25. Another slave blade scraper 26, identical to scraper 25, is engaged and located on the other band saw flight 27 which moves upwardly within the columnar frame 15 of the meat saw 10. Flight 27 is entirely enclosed in the frame 15. Each of the blade scrapers is a subassembly which may be attached to a plate 28 mounted to the lower portion of the frame 15, for example by nuts 29 (FIG. 9).

Each slave blade scraper has a support member or mount 30 on which is supported a pivot rod 31 which in turn extends through ears 32 on the opposite lower sides of a scraper blade holder 33 for pivotally supporting the scraper blade holder 33. The holder ears 32 are spaced from the opposite ends of the mount 30 for allowing slight lateral movement of the holder 33 along the rod 31. Supported on the scraper blade holder 33, on either side of the band saw blade 18, and in contact therewith, are two resilient scraper blades 35. The scraper blades 35 each have a scraping edge 36 which is cut on a bias diagonally across the leading end of the scraper blade (FIGS. 7 and 9) so that the edge 36 contacts a respective side of the band saw blade 18 at an acute angle to the path of movement of the band saw blade 18. The blade holder 33 mounts the scraper blades 35 at an angle with respect to each other and to the saw blade 18 so that the blades are biased toward each other at their scraping edges 36 and the scraping edges will lie flat against the opposite sides of the saw blade 18.

The mounting arrangement of the scraper blades 35 relative to the saw blade 18 closely resembles a snowplow in which the scraping edges 36 are oriented to face into the direction of movement of the saw blade to scrape debris therefrom and throw it laterally and forwardly of the band saw blade 18 in a direction away from the lower wheel 17. The scraping blades 35 are mounted so as to place the longest dimension of the blade 35 closest to the mount 30 (i.e., closest to plate 28, as shown in FIG. 9), so that the blade length then becomes progressively shorter across the width of the blade, as seen moving outwardly from the mount 30.

As the band saw blade 18 passes between the scraper blades 35, it tends to push them, due to frictional drag, in the same direction as the band saw blade is moving. The pivot rod 31 defines a pivot having an axis of rotation behind the center line of the band saw blade (FIG. 9), and substantially transverse to the direction of movement of the flight of the band saw blade on which the particular slave blade scraper is engaged. The force which the band saw blade imparts to the scraper blades, and through them to the scraper blade holder 33, tends to rotate them about the pivot rod 31 in the direction of movement of the saw blade. As illustrated in FIG. 9, this force F tends to rotate the assembly clockwise about the pivot rod 31. To limit this rotation, a carbide stop 38 is also carried on holder 33. The stop 38 is positioned for engaging the rear edge of the band saw blade 18 when the scraper blades 35 and blade holder 33 are rotated by force F to exactly the position in which an outer end 39 of the scraping edge 36, opposite an inner scraping edge end 37 is substantially adjacent to but inwardly of the gullets of the teeth 21 of the saw blade 18 (FIGS. 7 and 9). It has been found that optimum cleaning performance results when the scraping edges scrape as near as possible to the area of the tooth gullets. Deviations from this position, as small as 1/32 inch in some meat saws, can result in disappointing performance.

The scraping edge 36 effectively ends at point 39, since beyond that point the edges of the scraper blades angle outwardly or are beveled at 44 (FIGS. 7 and 8) to provide clearance for the saw blade teeth and facilitate easy insertion of the band saw blade 18 into the scraper assembly between the scraper blades 35. The leading scraping edges 36 of the scraper blades 35 are in contact with one another prior to insertion of the band saw blade 18 therebetween, whereas the beveled forward tips 44 of the scraping edges 36 form an open, inverted V-configuration for receiving the band saw blade 18 to guide its insertion between the scraper blades 35.

In a typical meat saw and in some cutting conditions, the saw blade 18 may be moved as indicated by the double headed arrows pointing left and right in FIG. 9. Every time a piece of meat is pressed against the saw blade (from right to left as shown in FIG. 9), the blade deviates from its neutral or equilibrium position (moving to the left as shown in FIG. 9). The slave blade scrapers automatically and precisely follow this movement. As the blade moves to the left (FIG. 9), stop 38 likewise rotates the blade holder 33 and scraper blades 35 to follow the movement of the saw blade 18 exactly. When the saw blade 18 returns to the right, force F then rotates the scraper blades 35 in the other direction to keep stop 38 in contact with the rear edge of the band saw blade 18, and the scraping edges 36 always in the proper position relative to the band saw blade.

As the debris is thrown forward and laterally away from the band saw blade 18 and the lower band wheel 17, it is caught for subsequent convenient disposal in removable catching means which comprises the invention claimed in aforementioned application Ser. No. 151,214. The catching means is actually a removable lower enclosure 40 for the lower band wheel 17 which mounts on the lower plate 28. Lower enclosure 40 has an external outwardly convex bucket-shaped contour which extends outwardly and downwardly when mounted in position as seen in FIG. 1, and forms a bucketshaped compartment on the operator's side of the lower band wheel 17. The enclosure 40 includes a bottom 41 which slopes downwardly and away from the lower band wheel 17 to catch and retain the debris at a location away from the lower band wheel.

By combining the debris-collecting function with the wheel-and-blade-covering function in the lower enclosure 40, several advantages are obtained. First, it is not necessary to provide a separate and distinct debris collecting bucket, nor special mounting and supporting structure therefor. Secondly, even though the blade scrapers 25 and 26 direct most of the debris along reasonably well defined paths, some scattering of the debris is inevitable. The smaller the bucket, the smaller the "target." Thus, by making the entire enclosure 40 serve this purpose, not only is the bucket eliminated, but it is assured that the greatest amount of debris will be caught in the removable enclosure 40 itself.

The entire lower enclosure 40 is mounted on the plate 28 attached to frame 15 for convenient manual removal whenever desired. This not only facilitates removal of the debris and cleaning of the enclosure, but, by better exposing the entire underside of the table 14, eases the cleaning of the entire saw 10 as well.

Similarly, an upper enclosure 42 is mounted for easy manual removal and attachment to an upper plate 43 which, in turn, is mounted to the columnar frame 15. The upper enclosure 42 is located on the operator's side of the meat saw 10, and consists of an outwardly convex cover which forms a compartment on the operator's side of the upper band wheel 16. No blade scrapers are provided in the upper enclosure 42 since the two blade scrapers 25 and 26 associated with the band saw blade 18 in the lower enclosure 40 have been found to remove more than 95 percent of the scraps and debris and cause collection of the same in the lower enclosure 40.

For manually removing and reattaching the enclosures 40 and 42, each has a pair of buttons 49 on the top which are received in corresponding holes in spring clips 50 mounted on the top edge of the respective plates 28 and 43 of the meat saw 10. Adjacent the opposite sides of the plates 28 and 43 and enclosures 40 and 42 at the peripheral bottom edges thereof are cooperating elements for anchoring the enclosures 40, 42 to the respective plates 28, 43, as each of the enclosures is pivoted toward and away from its corresponding plate in attachment and removal of the enclosures to and from the meat saw 10. These cooperating elements may take several forms.

In a first form, the elements comprise a pair of blocks 55, each having a semi-cylindrical groove 56 in the face thereof opposite the enclosure 40 or 42. When the enclosures are in attached position mounted to the plates on the meat saw 10, the grooves 56 engage, receive, and are secured upon a pair of pins 57 (FIG. 4) which are supported in extended position from the plates 28 and 43 on the meat saw 10, as may be seen in FIGS. 3 and 6. The blocks 55 are firmly held upon the pins 57 by the spring clips 50 when the buttons 49 are snapped into position in the spring clips. This captures the enclosures between the pins and the spring clips. Of course, the spring clips and buttons could be reversed, as well as the pins and blocks, if desired.

To remove a housing, it is necessary only to lift the corresponding pair of spring clips 50 to release the buttons 49 on that enclosure. The pins 57 and groove 56 are oriented to define a pivot and a horizontal axis of rotation (see FIG. 2) around which the cover is then downwardly rotated to move the buttons away from beneath the spring clips 50. When the enclosure is thus rotated around the axis of rotation of groove 56 and pins 57, the blocks 55 can easily be lifted away from the pins, and the collected debris is retained therein for removal from the meat saw. The enclosure is reattached by reversing the process, engaging the grooves 56 on the pins 57, rotating the enclosure upwardly around the axis which they define, and sliding the buttons 49 under the spring clips 50 until they snap into the holes therein.

In a second form, the cooperating elements are comprised by a bottom peripheral depending flange on the enclosures, only the flange 60 on the lower enclosure 40 being shown in FIG. 10, and a pair of U-shaped brackets 62 mounted in inverted upstanding fashion upon an inturned lip 64 on the bottom edge of each of the plates 28, 43, only one of the brackets 62 on the lower plate 28 being seen in FIGS. 10 and 11. The lower flange 60 and brackets 62 cooperate in substantially the same way as the grooved blocks and pins previously described to anchor the lower edge of the respective enclosures to its corresponding plate so as to facilitate pivoting of the enclosure relative thereto. Once the enclosure has been released at the top, it may be pivoted away from the plate and then lifted such that the flange 60 is withdrawn from between the bracket 62 and plate 28 or 43. The procedure is reversed to install and reattach the enclosure on the meat saw with the flange 60 first being inserted between the brackets 62 and plate 28 or 43, and the enclosure then rotated toward the respective plate until the buttons 49 are snapped into position in the spring clips. As above, the enclosure is captured between the brackets 62 and spring clips 50.

As may be seen, therefore, the removable catching means has numerous advantages. Principally, it collects the scrap debris from the meat saw in a highly efficient and convenient manner, and provides for quick and easy removal of the debris and cleaning of the meat saw. The slave blade scrapers of the present invention precisely follow deviations in the saw blade position and deflect and throw the debris laterally away from the meat saw blade and the lower band wheel, where the lower enclosure then catches and retains it, so that redeposition of the debris onto the band saw blade is virtually eliminated. When either the lower or upper enclosure and area of the meat saw covered thereby is to be cleaned, either partially or completely, the corresponding enclosure can be quickly and easily removed simply be releasing a pair of spring clips and rotating the enclosure away therefrom. Then, either that enclosure alone can be cleaned, just to remove accumulated scrap debris, or, as at the end of the day, the entire meat saw can be cleaned. In either case, it will be appreciated that a separate scrap collecting bucket has effectively been eliminated, so that there are fewer components to be cleaned. Also, when the enclosures are removed, the band saw 10 is more completely accessible for cleaning. Further, the tilted position of the columnar frame 15 of the meat saw, as shown in FIG. 1, is such that the axes of rotation of the band wheels 16 and 17 are inclined from the horizontal. This helps to avoid redeposition by locating the lower band wheel 17 other than directly beneath the blade scrapers 25 and 26.

While the form of apparatus herein described constitutes a preferred embodiment of the invention, it is to be understood that the invention is not limited to this precise form of apparatus, and that changes may be made without departing from the scope of the invention.

What is claimed is:

1. For use in a band saw having a band saw blade with a forward cutting edge for cutting products such as meat or the like and means for moving said blade in a cutting operation, a blade scraper assembly for removing debris from said band saw blade, said scraper assembly comprising:
   a. a pair of scraper blades,
   b. a scraper blade holder mounting said scraper blades one on each side of said band saw blade such that a leading edge of each scraper blade contacts said band saw blade facing into the direction of movement of said band saw blade, said holder being movably mounted to said band saw such that said leading scraper blade edges will have imparted thereto, by said contact with and movement of said band saw blade therebetween, forces tending to move said scraper blades and holder in the direction of movement of said band saw blade, and
   c. stop means on said holder at a rear edge of said band saw blade and being movable with said holder for contacting said rear edge of said band saw blade and thereby limiting forward movement of said scraper blades, whereby said stop means cooperates with said scraper blade holder so as to substantially maintain said leading edges of said scraper blades in a predetermined positional relationship with respect to said forward cutting edge of said band saw blade.

2. For use in a band saw having a band saw blade with a forward cutting edge for cutting products such as meat or the like and means for moving said blade in a cutting operation, a blade scraper assembly for removing debris from said band saw blade, said scraper assembly comprising:
   a. a pair of scraper blades,
   b. a scraper blade holder mounting said scraper blades one on each side of said band saw blade such that a leading edge of each scraper blade is pressed in contact against said band saw blade facing into the direction of movement of said band saw blade, said holder being pivotally mounted to said band saw such that said leading scraper blade edges may pivot in a plane defined by said band saw blade and will have imparted thereto, by said contact with and the movement of said band saw blade therebetween, forces tending to pivot said scraper blades and holder forwardly and in the direction of movement of said band saw blade, and
   c. stop means extending from said scraper blade holder to a location proximate said rear edge of said band saw blade, said stop means also being pivotable with said holder for contacting said rear edge of said band saw blade and thereby limiting forward pivoting of said scraper blades, whereby said stop means cooperates with said pivotally mounted scraper blade holder so as to substantially maintain said leading edges of said scraper blades in a fixed predetermined positional relationship with said forward cutting edge of said band saw blade.

3. For use in a band saw having a band saw blade with a forward cutting edge for cutting products such as meat or the like and means for moving said blade in a cutting operation, a blade scraper assembly for removing debris from said band saw blade, said scraper assembly comprising:
   a. a support member attachable to said band saw adjacent said band saw blade,
   b. pivot means on said support member defining a pivotal axis behind the center line of said band saw blade and substantially transverse to the direction of movement of said band saw blade,
   c. a pair of resilient scraper blades having scraping edges on one end thereof,
   d. a scraper blade holder pivotally mounted on said pivot means and supporting said scraper blades one each on each side of and biased and spring toward each other against the band saw blade and oriented to press said scraper blade scraping edges against the band saw blade facing into the direction of movement of said band saw blade, to grip said band saw blade so that the latter imparts a force to said scraper blades as it runs therebetween tending to pivot them and said blade holder about said pivot axis forwardly in the direction of movement of said band saw blade, and e. stop means on said blade holder positioned for engaging a rear edge of said band saw blade when said scraper blades and blade holder are pivoted by the movement of said band saw blade to a position in which an end of each of said scraper blade scraping edges is located adjacent to said forward cutting edge of said band saw blade, said stop means thereby cooperating with said blade holder to cause said scraper blades to follow deviations in the band saw blade position and maintain proper scraper blade position with respect to said forward cutting edge of said band saw blade.

4. The scraper blade assembly of claim 3 wherein said stop means comprises a carbide back-up button.

5. For use in a band saw having a band saw blade, a blade scraper assembly comprising:
   a. a pair of scraper blades,
   b. a scraper blade holder mounting said scraper blades one on each side of said band saw blade such that a leading edge of each scraper blade is engaged with said band saw blade, and
   c. a forward tip of said leading edge of each of said scraper blades being beveled to facilitate insertion of said band saw blade into said blade scraper assembly between said scraper blades.

6. The blade scraper assembly of claim 5, wherein said leading edges of said scraper blades are in contact with one another prior to insertion of said band saw blade therebetween whereas said beveled forward tips of said leading edges form an open V-configuration for receiving said band saw blade to guide insertion of the same between said scraper blades.

* * * * *